United States Patent
Olson et al.

(10) Patent No.: US 6,571,744 B1
(45) Date of Patent: Jun. 3, 2003

(54) ADJUSTABLE TETHERING DEVICE AND METHOD

(76) Inventors: Ronald Olson, 3751 Rollins Rd., Tucson, AZ (US) 85739; Larry Nelson, P.O. Box 123, Hunter, SD (US) 58048; John Slattery, 13141 E. Speedway, Tucson, AZ (US) 85748

( * ) Notice: Subject to any disclaimer, the term of this patent is extended or adjusted under 35 U.S.C. 154(b) by 0 days.

(21) Appl. No.: 10/121,945

(22) Filed: Apr. 12, 2002

(51) Int. Cl.[7] .............................. A01K 1/04; A01K 3/00
(52) U.S. Cl. ........................................ 119/780; 119/769
(58) Field of Search ................................ 119/769, 771, 119/780, 774, 783

(56) References Cited

U.S. PATENT DOCUMENTS

| | | | |
|---|---|---|---|
| 244,843 A | * 7/1881 | Battelle | 119/780 |
| 1,181,881 A | * 5/1916 | Hausz | 119/780 |
| 2,981,230 A | * 4/1961 | Putnam | 119/780 |
| D269,556 S | 6/1983 | Studley et al. | |
| 4,738,222 A | 4/1988 | Terry et al. | |
| 5,329,882 A | 7/1994 | Hunt | |
| D353,477 S | 12/1994 | Terry | |
| 5,685,133 A | 11/1997 | Travis | |
| 5,775,264 A | 7/1998 | Dixon et al. | |
| 6,115,889 A | 9/2000 | Mickelson | |
| 6,142,103 A | 11/2000 | Meyers et al. | |

OTHER PUBLICATIONS

Equestrian Safety Products, www.springtie.com, viewed Aug. 6, 2002, Internet (World Wide Web).

EasyCare, Inc., www.hitie.com, viewed Aug. 6, 2002, Internet (World Wide Web).

Equine Performance Products, www.equineperformanceproducts.com/tiez.htm, viewed Aug. 6, 2002, Internet (World Wide Web).

Equine Innovations, Inc., www.powernet.net/~equineinnov/skyhook.html, viewed Aug. 7, 2002, Internet (Word Wide Web).

* cited by examiner

*Primary Examiner*—Charles T. Jordan
*Assistant Examiner*—Judith A. Nelson
(74) *Attorney, Agent, or Firm*—Fish & Richardson, P.C., P.A.

(57) ABSTRACT

An adjustable tethering device for various objects, including horses and other animals, includes a tie arm attachment structure, an elongated tie arm, a brace and a support structure which includes a bearing surface. The tie arm has one end pivotally attached to the tie arm attachment structure. The other end of the tie arm has an attachment point to which a lead of the object being restrained, such as a horse, may be attached. One end of the brace is pivotally attached to the tie arm between the tie arm attachment structure and the attachment point. The opposite end of the brace is supported by the bearing surface of the support structure when the tie arm is in an elevated position. In one embodiment, the tie arm attachment structure and the support structure comprise a single C channel. When used on a structure such as a trailer the adjustable tethering device may be adjusted between a travel position and one or more elevated positions. In various embodiments, when the device is in the travel position the tie arm and the brace are nestingly received in the C channel which comprises the fixed support. In various embodiments, a portion of the tie arm comprises a flexible material.

20 Claims, 5 Drawing Sheets

ADJUSTABLE TETHERING DEVICE AND METHOD

FIELD OF THE INVENTION

This invention generally relates to a device and method for restraining and, more particularly, to an adjustable device and method for tethering an animal to a structure.

BACKGROUND OF THE INVENTION

Tethering of animals to a structure is well known. Examples of structures include the wall of a stall, a barn, a trailer, a hitching post or a fence. A lead attached to the animal is secured on one end to the structure and on the opposite end to the animal usually by connecting to a halter or other type of headgear worn by the animal.

Trailers are used to transport animals. Often, after arriving at the desired destination, it is necessary to tie the animal to the trailer for extended periods of time. Examples in the case of horses include situations where a horse is transported to a horse show or trail ride and then tied to the trailer at the horse show or trail ride when the horse is not being ridden. During the time away from home, the horse will spend much of its time standing tied to the trailer which was used to transport the horse. It is important that the horse can be safely and comfortably restrained in such situations. Most horse trailers include rings or other means of tying a horse to the trailer. A typical horse trailer may include two or three rings on either side, depending on the size and configuration of the trailer. The rings are generally mounted at approximately bellybutton height for a typical 6' adult, although this can vary somewhat depending on the trailer manufacturer. In locating the tie rings on a horse trailer the manufacturer must select a location which will accommodate a large percentage of population, both male and female. It is for this reason that the tie rings on most trailers are located at approximately the same height. The horse is secured by tying the end of the lead not attached to the horses' halter to the ring. Typically, the lead connected to the horse's halter is looped through the ring and then a knot is tied.

For various reasons, horses sometimes pull against the lead. The horse may become spooked, it may be bored, it may be a dumb horse, or it may simply pull against the lead out of habit. When a horse pulls it can injure itself. First, it can injure itself in the process of pulling. Second, when a horse pulls back forcefully against a fixed restraint (such as a tie ring on a trailer) it also tends to spring forward suddenly. In springing forward the horse may strike the side of the trailer and injure itself The commotion caused by a horse pulling also disturbs people who may be in the tack room portion of the trailer. Some horse trailers include sleeping quarters. A horse pulling on the trailer can make it more difficult to sleep.

Generally, and within reason, the lower the horse is tied on the trailer the harder it can pull. Thus, it is preferable that the end of the lead be tied at a height at or above the height of the horse's head. With many horses and horse trailers, this means that the point at which the lead is tied would be approximately the same height as the roof of the trailer. However, depending on the circumstances, including the height of the horse and the height of the individual attempting to tie the horse to the trailer, tying a horse at that height to a permanently fixed restraint would be extremely difficult if not impossible.

Another problem associated with tying a horse to a tie ring on a trailer is that it tends to place the horse in close proximity to the side of the trailer. Horses tied to a trailer have a tendency to paw at the ground and in doing so to bang the trailer with their lower leg and/or hoof. When this happens the horse may be injured. The horse may also dent or ding the trailer when it hits the trailer. Many horse trailers are constructed all or in part of aluminum. An aluminum trailer is more prone to dent than a steel trailer when the horse bangs it with its lower leg and/or hoof.

Although in some situations it is possible to use a longer lead which will allow the horse to stand further away from the trailer if it desires, using a long lead has drawbacks because the chances of the horse becoming entangled in the lead increase with the length of the lead. Even with a long lead, the horse is a creature of habit and often will stand near the trailer despite the longer lead.

Another problem associated with tying a horse to a tie ring on a trailer is that a horse has limited movement. Assuming the horse is tied relatively "short" (meaning the length of the lead between the horses' halter and the tie ring is kept short), the horse has a limited ability to move forward and backward (towards or away from the trailer). The horse can rotate its hind quarters approximately 180° degrees from a position where it is standing parallel to the trailer with its hind quarters nearer the back of the trailer to the opposite position where it is standing parallel to the trailer with its hind quarters nearer the front of the trailer. Tying the horse "longer" (meaning the length of the lead between the horses' halter and tie ring is lengthened), allows more forward and backward movement, and perhaps some additional rotational movement, but also increases the likelihood the horse will become entangled in the lead.

SUMMARY OF THE INVENTION

In accordance with an illustrated preferred embodiment of the present invention, an apparatus for restraining an object that is novel and improved upon over the prior art is provided. The apparatus includes a tie arm attachment structure, an elongated tie arm having a first end pivotally attached to the tie arm attachment structure and a second end having an attachment point to which a lead may be attached, a brace which has a first end pivotally attached to the tie arm between the attachment point and the tie arm attachment structure, and a support structure, positioned the below the tie arm attachment structure, which provides a bearing surface for the brace to support the tie arm in an elevated position. In various embodiments a portion of the tie arm comprises a flexible material.

Transporting animals in trailers poses a particular problem in that restraining or tethering facilities may not be present at various locations. It is an objective to provide an animal tethering system that is mounted to a structure, such as a trailer, that extends generally perpendicularly from the structure when in use and conveniently retracts to a position parallel with the side of the trailer when not in use. It is a further object of the invention to provide an adjustable animal tethering system attachable to a structure. In one embodiment, the system includes a C channel fixed to a structure in a generally vertical position. The web and flanges of the C channel have various openings to accommodate a support arm. A tie arm is pivotally connected on one end to the C channel and at the other end to a tether which is capable of receiving the lead of an animal. The support arm pivotally attaches to the tie arm between the ends of the tie arm.

Still another objective of the present invention is to provide a method of securing an animal to a structure using an adjustable animal tethering system which may be adjusted between first and second positions, such as a travel position and a elevated position.

It is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the invention. It is important, therefore, that the claims be regarded as including such equivalent constructions insofar as they do not depart from the spirit and scope of the present invention.

DETAILED DESCRIPTION OF THE INVENTION

Figure 1:
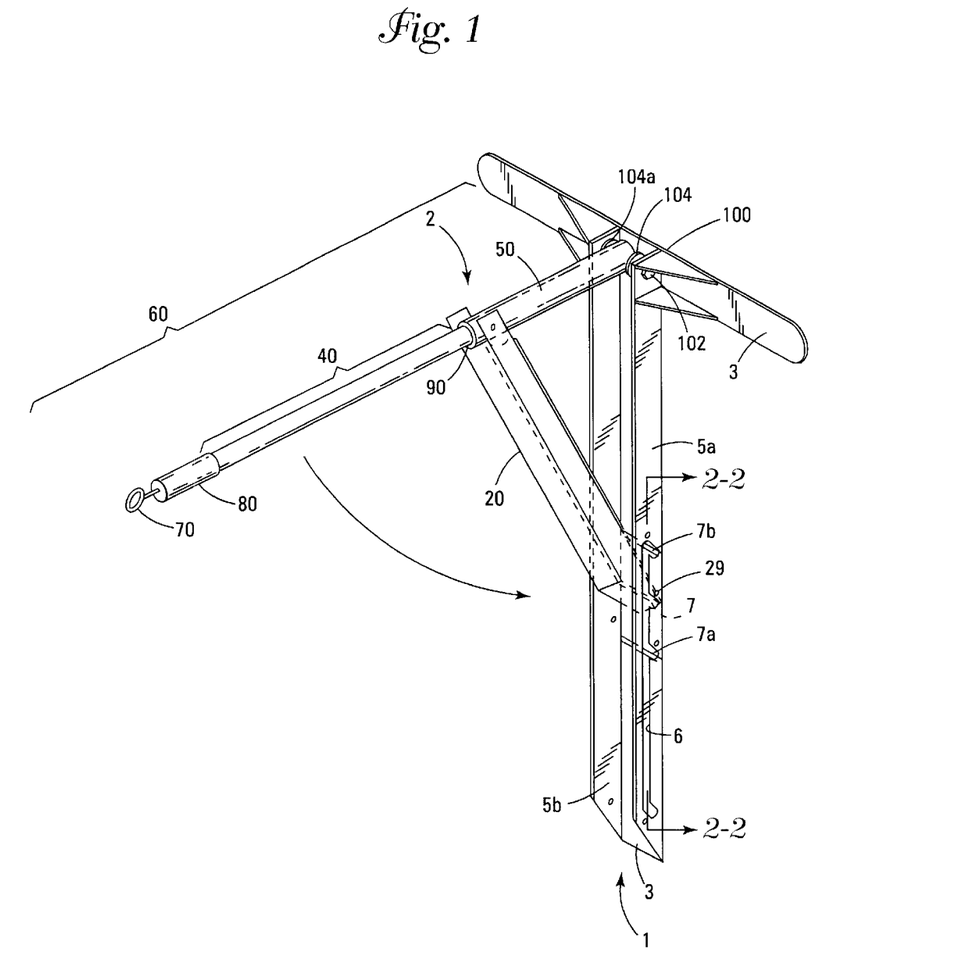
FIG. 1 is a perspective view of an embodiment of an adjustable animal tethering system made in accordance with the present invention.

For a fuller understanding of the nature and desired objects of this invention, reference should be made to the following detailed description taken in connection with the accompanying drawings. Referring to the drawings wherein like reference numerals designate corresponding parts throughout the several figures, reference is made first to FIG. 1. FIG. 1 of the drawings illustrates an embodiment of an adjustable tethering device 2 made in accordance with the present invention.

Figure 5:
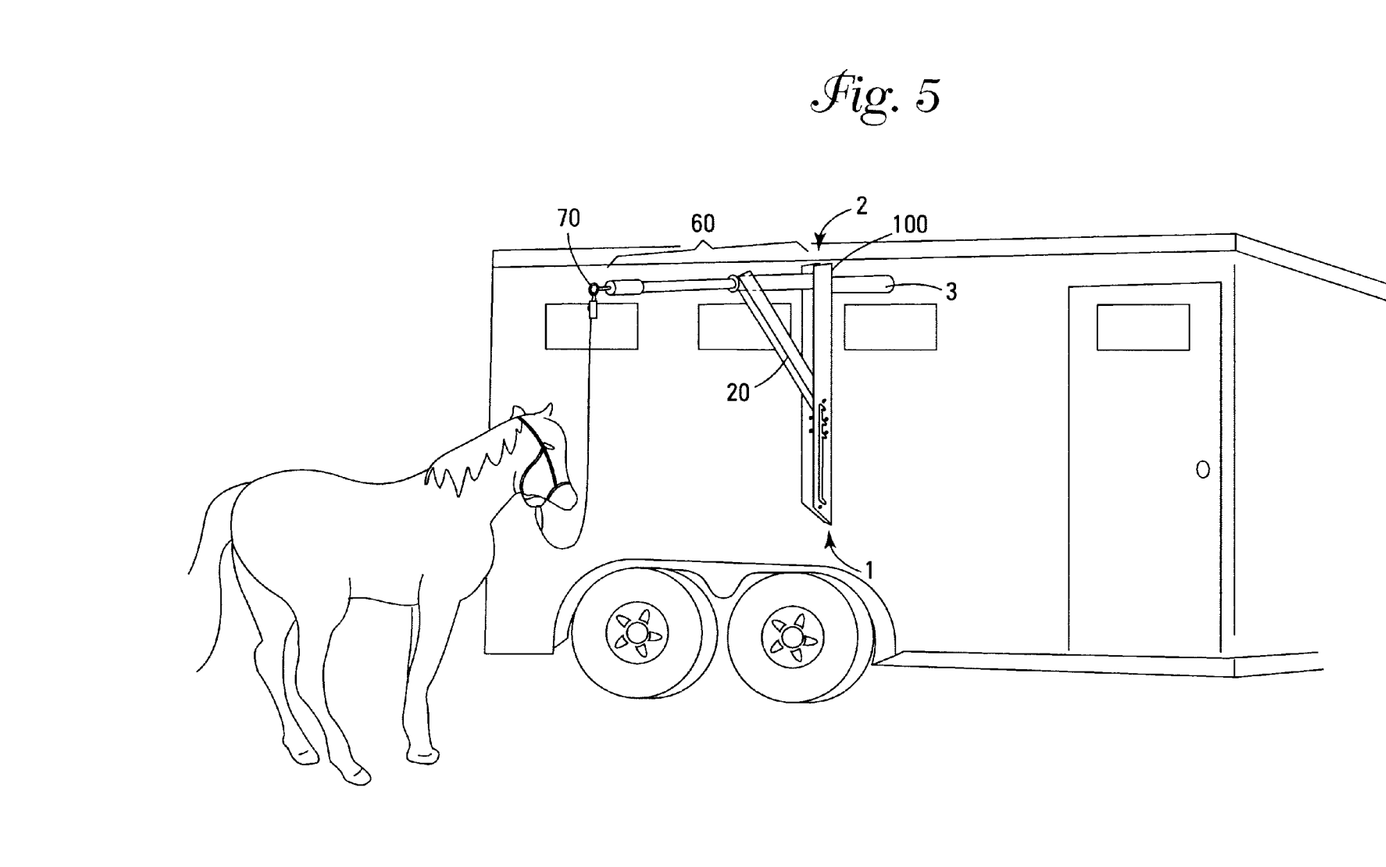
FIG. 5 is a view of the embodiment of FIG. 1 of the adjustable tethering device mounted on a trailer with a horse tethered to the invention.

The adjustable tethering device 2 generally comprises a tie arm 60, a tie arm attachment structure 100, a brace 20 and a support 7 surface, capable of supporting the brace 20. As can be seen in FIG. 1 and FIG. 5, the tie arm 60 is pivotally attached to the tie arm attachment structure 100 which allows the tie arm 60 to be moved up and down. A tether 70 is attached to the opposite end of the tie arm 60. Brace 20 is pivotally attached to tie arm 60 between tie arm attachment structure 100 and tether 70. One or more support structures 7, 7a, and 7b support brace 20 and thereby tie arm 60 in the desired position.

As shown in FIG. 5, the adjustable tethering device 2 may be mounted to the side of a trailer. In a presently preferred embodiment, fixed support 1 is preferably mounted to a vertical support member of the trailer. A horizontal support 3 may also be mounted to the trailer as shown in FIG. 5. One of skill in the art would appreciate that the present invention may be mounted to the trailer using a variety of well-known methods including, for example, by welding or bolting the invention to the trailer. In a presently preferred embodiment the invention is attached to the trailer as an "aftermarket" accessory. However, the scope of the invention also encompasses including the invention as an integral part of the frame of a trailer during construction of the trailer.

One of ordinary skill in the art would appreciate that the present invention could be utilized for tying a variety of different animals to a trailer. Further, in various alternative embodiments, the present invention could be utilized for tying a variety of different animals to a stationary structure such as a barn, arena, or hitching post. Other alternative embodiments within the scope of the invention include objects requiring restraint, but at the same time flexibility in the restraining arm and easy adjustability, while attached to a structure.

In FIG. 1 the invention is in an elevated position. Throughout this description, the terms "elevated position" and "travel position" will be used. These terms are used for convenience only and should not be construed as limiting the scope of the invention in any fashion. "Elevated position" refers to any of a variety of positions in which the tie arm 60 is extended away from the fixed support 1 such that it is no longer essentially parallel with fixed support 1. In a preferred embodiment, tie arm 60 may be placed in any of several elevated positions depending on factors such as the height of the horse, the height of the horse trailer, and the personal preferences of individual tethering the horse. The adjustable tethering device 2 allows the height of the tie arm 60 to be readily adjusted between different elevated positions with minimum physical effort. Thus, the invention is useful to a wide range of people of different heights and strengths. "Travel position" refers to the position shown in FIG. 4 in which tie arm 60 and brace 20 are collapsed together and nestingly received between flanges 5a and 5b of fixed support 1. In this position, brace 20 and tie arm 60 are essentially parallel with fixed support 1.

Fixed support 1 is preferably aluminum channel. In a presently preferred embodiment, fixed support 1 is ¼"×2¼"×3" aluminum C channel. The web or backbone of fixed support 1 is labeled as element 3. The flanges of fixed support 1 are labeled as elements 5a and 5b. Fixed support 1 has at least one opening 7 cut horizontally through web 3. In a preferred embodiment, fixed support 1 includes several openings 7, 7a, and 7b, cut through web 3. Preferably, the openings are horizontal grooves cut through web 3 of fixed support 1 (between flanges 5a and 5b). As shown in FIG. 1, brace 20 is supported by groove 7. In a presently preferred embodiment, brace 20 is ¼"×2½"×2" aluminum C channel. The flanges of brace 20 are labeled as 21a and 21b.

In embodiments with multiple grooves 7 (such as the additional grooves shown by elements 7a and 7b), brace 20 may be adjustably placed in any one of grooves 7, 7a, and 7b, thereby allowing the height of tie arm 60 to be adjusted. The number of grooves 7 and the location of those grooves are design considerations which may vary while still remaining within the scope of the present invention. Factors relevant in determining which groove 7 of fixed support 1 the movable arm 20 should be supported by include, but are not limited to, the height at which the adjustable tethering device 2 is mounted on the trailer, the height of the trailer, and the height of the animal to be restrained.

It is to be understood that the terms "fixed" and "movable" are not used in the absolute sense. Rather, those terms simply illustrate the difference between fixed support 1 which remains in the same position irrespective of whether the invention is in the travel position or the elevated position and brace 20 which is in different positions depending on whether the invention is in the travel position or the elevated position. Further, the present invention is not limited to embodiments where the fixed support 1 comprises a single C channel. Alternative embodiments may include a tie arm attachment structure 100 mounted to a structure and one or more separate support surfaces 7 positioned below the tie arm attachment structure 100 and providing a bearing surface for brace 20.

Figure 2:
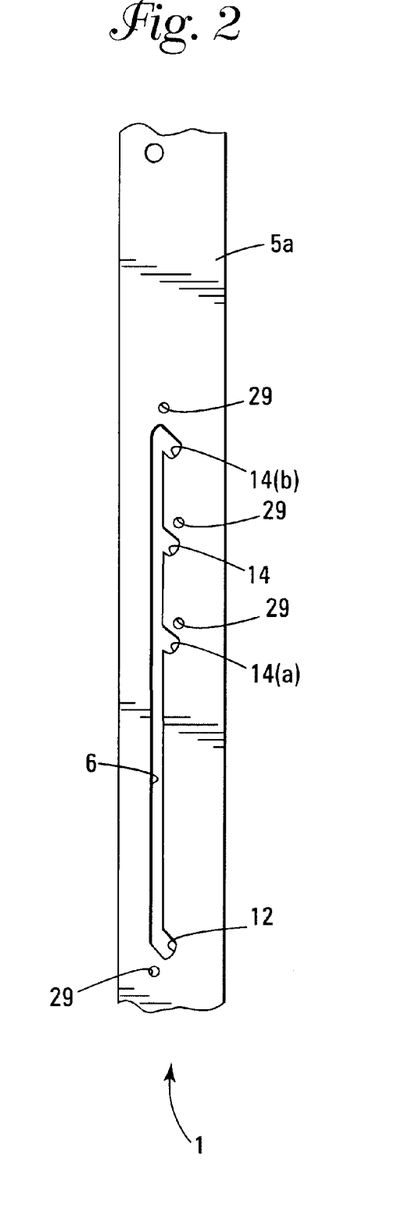
FIG. 2 is a view taken along line 2—2 of FIG. 1 showing one flange of the fixed support in one embodiment of the invention.

Fixed support 1 includes a longitudinal slot 6 in flange 5a. FIG. 2 is a side view of fixed support 1 showing flange 5a containing longitudinal slot 6. Longitudinal slot 6 includes a travel position notch 12 and at least one elevated position notch 14. Additional elevated position notches 14a and 14b may also be included. The elevated position notches correspond to horizontal openings 7, 7a, and 7b. A presently preferred embodiment includes elevated position notches 14 and 14(b). One of skill in the art would recognize that flange 5b may also include a longitudinal slot and notches which mirror longitudinal slot 6 and notches 12, 14, 14a, and 14b of flange 5a.

Figure 3:
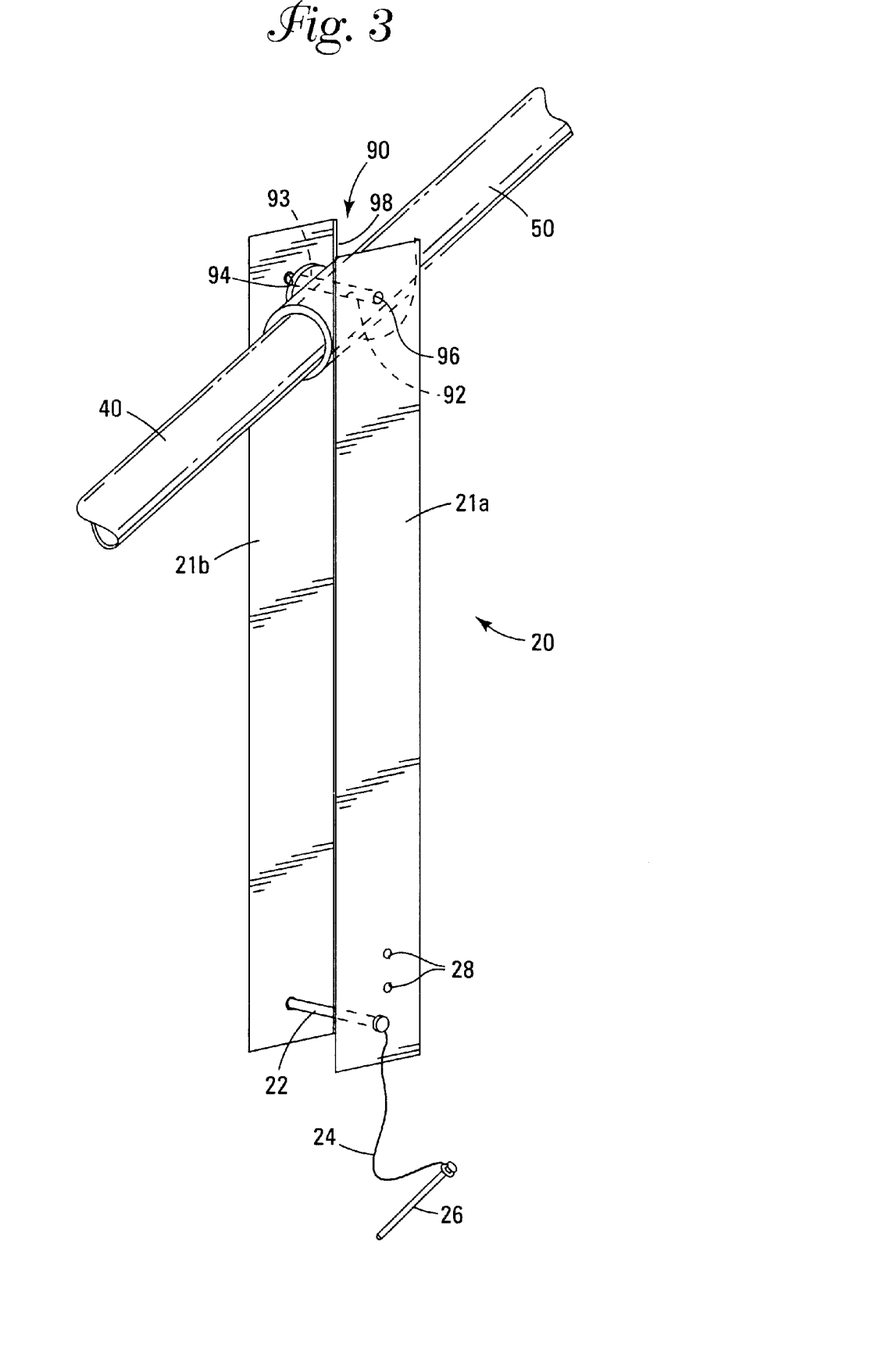
FIG. 3 is a detailed perspective view of the brace including a view of the hinge joint which pivotally connects the brace to the tie arm in the embodiment of FIG. 1 of the invention.

As shown in FIG. 3, in a preferred embodiment, brace 20 includes a pin 22 which is permanently fixed between flanges 21a and 21b. Pin 22 travels in groove 6 of fixed support 1 when tie arm 60 is being moved between the travel position and one of the elevated positions. One of skill in the art would readily appreciate that in alternative embodiments pin 22 may be removable from brace 20. A second pin 26 is attached by cable 24 to the end of pin 22. When brace 20 is in either the travel position or a desired elevated position, pin 22 will be supported by and rest in one of the notches (12, 14, 14a, or 14b) of groove 6. Because the weight of the brace 20 and tie arm 60 will be generally downward, brace 20 will tend to remain in the notch. The notch works in conjunction with horizontal groove 7 to securely fix brace 20 to fixed support 1. After brace 20 is in the desired elevated position, it is further secured by inserting pin 26 through hole 29 of flange 5a and the relevant hole 28 of flange 21a as well as corresponding holes in flanges 21b and 5b. Holes 28 and 29 in the respective flanges align and the placement of pin 26 into the holes locks the brace 20 in place relative to the fixed support 1. In the elevated position, pin 26 ensures that even if the horse pulls on its lead and thereby exerts a force on tie arm 60 which would otherwise tend to dislodge brace 20 from the desired horizontal groove of fixed support 1, such dislodgement should not occur if pin 26 is in place.

Figure 4:
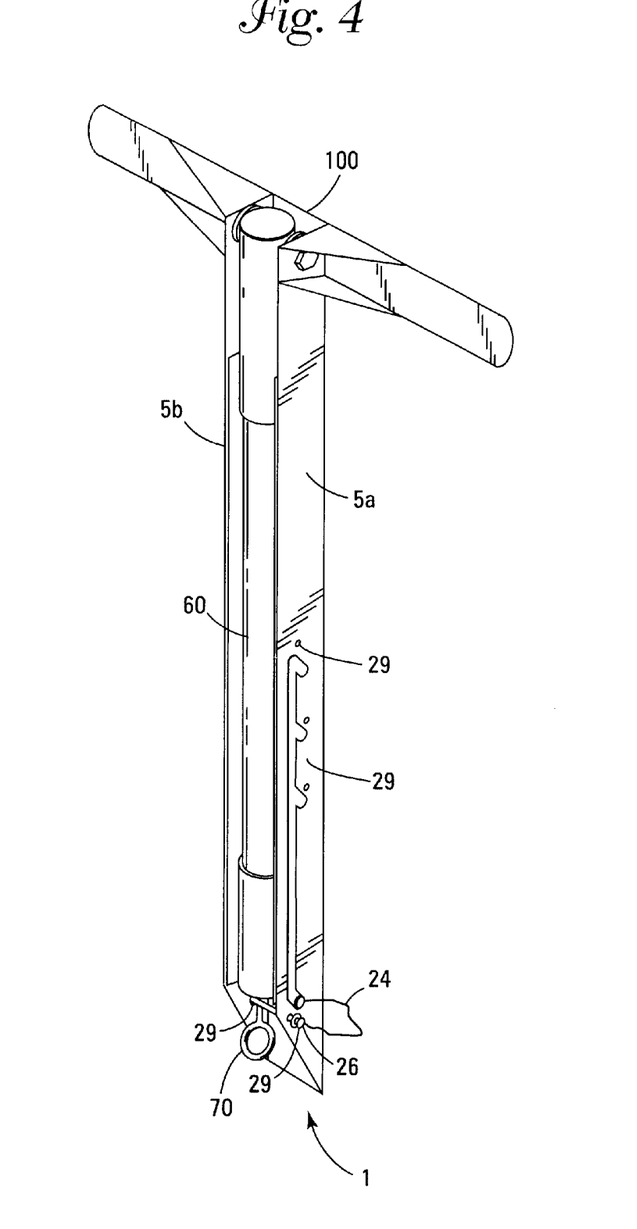
FIG. 4 is a view of the embodiment of FIG. 1 in the travel position.

In a preferred embodiment, fixed support 1 is approximately 5' long and brace 20 is approximately 3' long. It is preferred that fixed support 1 is of a sufficient length that when the invention is in the travel position (as shown in FIG. 4), tie arm 60 and brace 20 will be contained between flanges 5a and 5b of fixed support 1 and extend downward to a point where pin 26 extends snugly across the neck of tether 70. Tie arm 60 is preferably approximately 4' long. It is believed this length will allow a majority of horses tied to tie arm 60 to have 360° rotational mobility. Flexible shaft 40 is preferably 26" long. Rigid shaft 50 is preferably 1¾" diameter aluminum shaft and 14" long. Rigid shaft 80 is preferably 1¾" diameter aluminum shaft and 7½" long. Flexible shaft 40 is attached on each end to aluminum shafts 50 and 80. The means of attachment are well known to one of ordinary skill in the art. In a presently preferred embodiment, the attachment to rigid shaft 80 is by two recessed alien screws having the dimensions ⅜"×½". A presently preferred embodiment of the attachment to rigid shaft 50 is set forth below.

Brace 20 is rotatably connected to tie arm 60 at hinge 90. Hinge 90 is formed approximately at the point rigid shaft 50 and flexible shaft 40 are joined together. Rigid shaft 50 is a 1¾" aluminum shaft. Flexible shaft 40 is preferably constructed of polybutylene terephalate (PBT) which is commonly referred to by the brand name "HYDEX 4101." HYDEX 4101 can presently be obtained by contacting A.L Hyde Co., Grenlock, N.J., 08032 (www.alhyde.com). Flexible shaft 40 is sized so that it fits within the diameter of rigid shaft 50 and rigid shaft 80 as shown in FIG. 1. As can also be seen in FIG. 1, collectively rigid shaft 50, flexible shaft 40, and rigid shaft 50 form tie arm 60. As can be seen in FIG. 3, circular opening 92 extends through rigid shaft 50 and flexible shaft 40. In a preferred embodiment, this opening is 7/16" diameter. Flanges 21a and 21b include holes (shown by reference numbers 94 and 96) which are aligned with opening 92. A recessed hinge pin 93 protrudes through opening 92 and extends out on either side and into holes 94 and 96. Hinge pin 93 is secured on each end by two allen screws tapered into the flanges of channel 20. In a preferred embodiment, the allen screws are ½" in length and ⅛" in diameter. The upper web of brace 20 is removed (opening shown by reference numeral 98) to allow the free movement of tie arm 60.

As previously explained, in an elevated position, the lower end of brace 20 is supported by, for example, opening 7. The position of opening 7 on fixed support 1 determines the height of tie arm 20 when the invention is in the elevated position. If fixed support 1 includes multiple openings 7, 7a, and 7b as shown in FIG. 1, the height of tie arm 60 may be adjusted depending on the number of openings. It is an advantage of the present invention that the height of tether 70 of tie arm 60 can be adjusted based on the height of the horse being tied and/or the height of the trailer the horse is being tied to. It is another advantage of the present invention that tether 70 of tie arm 60 can be lowered as needed to allow a shorter individual to tie the lead to tether 70. After the lead is connected tether 70 of tie arm 60 can be raised into a desired position with a minimum of physical effort. It is also contemplated that in alternative embodiments the height of tie arm 60 could be varied by adjusting the length of brace 20.

In a preferred embodiment, tie arm 60 is comprised of two aluminum shafts, 80 and 50, and flexible shaft 40. The use of a HYDEX 4101 or a similar material for flexible shaft 40 allows the restraining device to exhibit elasticity when the animal pulls against it. It acts in much the same manner as a fishing pole in absorbing shock and providing resistance. It is the experience of the inventors that, paradoxically, when a horse begins to pull against the restraining device, if there is flexibility in tie arm 60, the horse is more likely to stop pulling. The fact that the lead being used to tie the horse is attached to the restraining device at an elevation above that at which the horse naturally holds its head also makes it more difficult for the horse to pull against the restraining device with enough force to move the trailer or hurt itself. Another advantage of the present invention is that when the lead is tied to tether 70 in the elevated position, the horse is less likely to entangle itself in the lead.

As shown in FIG. 1, tie arm 60 is pivotally connected to fixed support 1 at hinge 100. Hinge 100 is formed by pin 102 extending through the end of aluminum shaft 50 and flanges 5a and 5b. In a preferred embodiment, hinge 100 is comprised of a ½" bolt 102, spacers 104 and 104a, and a nut for securing bolt 102 (not shown). Pin or bolt 102 serves as the pivot point for tie arm 60 and allows tie arm 60 to be adjusted between the travel position and the desired elevated positions.

The end of tie arm 60 opposite of hinge 100 includes a tether 70 which may be a loop or fastener for attaching the horse to the tie arm. In a presently preferred embodiment, tether 70 is a stainless steel "I" bolt which provides a loop through which the lead of a horse can be tied. In another embodiment, tether 70 may be a breakaway device. Such devices are well known to those of ordinary skill in the art. One example of such a device is a "Turtle Snap."

FIG. 4 shows the invention in the travel position. Tie arm 60 is pivoted on hinge 100 into a generally parallel position with fixed support 1. As shown in FIGS. 1 and 3, brace 20 is pivoted on hinge 90 into a parallel position with fixed support 1. In the travel position, brace 20 is nestingly received within the flanges 5a and 5b of fixed support 1 and tie arm 60 is nestingly received within the flanges 21a and 21b of brace 20. Pin 26 extends through holes 29 of flanges 5a and 5b and snugly across the neck of "I" bolt 70 to secure tie arm 60 into place during travel. However, in the travel position pin 26 does not extend through the flanges 21a and 21b of the brace 20 because those flanges do not extend downward far enough.

An advantage of placing the invention in this position is that flexible shaft 40 is stored in a straight position because it is supported by and contained within the flanges of brace 20. If flexible shaft 40 has begun to bow after an extended period in the elevated position or from a horse repeatedly pulling on tie arm 60, after a period of time in the travel position it will tend to regain its original, straight configuration. This tendency is enhanced by using a material such as HYDEX 4101 to construct flexible shaft 40 because of its inherent tendency to return to its original position. Flexible shaft 40 may be thought of as having "memory" which allows it to return to and retain its original shape upon being placed in the travel position. It is desirable that flexible shaft 40 remain straight.

FIG. 5 shows an embodiment of the adjustable tether device 2 mounted on a trailer with a horse tethered. In a presently preferred embodiment, support element 1 is mounted vertically and extends to approximately the roof of the trailer. A horizontal support 3 may be used to provide lateral support.

Although the present invention and its advantages have been described in detail it should be understood that various changes, substitutions, and alterations can be made herein without departing from the spirit and scope of the invention as defined by the appended claims.

What is claimed is:

1. An apparatus for restraining an object, comprising:
   a tie arm attachment structure;
   an elongated tie arm which is capable of moving in a substantially vertical direction having a first end pivotally attached to the tie arm attachment structure and a second end having an attachment point to which a lead attached to the object is attachable;
   a brace having a first end pivotally attached to the tie arm between the attachment point and the tie arm attachment structure; and
   a support structure, positioned below the tie arm attachment structure, providing a bearing surface for a second end of the brace such that the brace supports the tie arm in an elevated position.

2. The apparatus for restraining an object of claim 1, wherein the tie arm attachment structure and the support structure comprise a single C channel.

3. The apparatus for restraining an object of claim 2, wherein the C channel is mountable on the side of a trailer and the tie arm pivots through a vertical plane extending substantially perpendicular from the side of the trailer.

4. The apparatus for restraining an object of claim 1, wherein a portion of the tie arm comprises a flexible material.

5. The apparatus of claim 3, wherein the tie arm and the brace are nestingly received within the C channel when the apparatus is in a travel position.

6. The apparatus for restraining an object of claim 1, wherein the support structure comprises a plurality of differently positioned bearing surfaces, wherein the second end of the brace is receivable on each of the plurality of bearing surfaces thereby allowing the height of the tie arm to be adjusted depending on the bearing surface selected.

7. A restraining device comprising:
   a fixed support having one or more openings formed therein;
   a tie arm extending perpendicular to the fixed support when the tie arm is in an elevated position, the tie arm having first and second ends, the first end of the tie arm having a tether attached thereto and the second end of the tie arm being pivotably connected to the fixed support at a position above the one or more openings; and
   a support arm having first and second ends, wherein the first end may be removably supported in any of the one or more openings and the second end is pivotably connected to the tie arm between the first and second ends of the tie arm.

8. The restraining device of claim 7, wherein a portion of the tie arm is comprised of a flexible material.

9. The restraining device of claim 7, wherein the fixed support comprises aluminum C channel having a web and first and second flanges and the support arm and the tie arm may be pivoted into a position such that support arm and the tie arm are nestingly received within the flanges of the fixed support.

10. An adjustable animal tethering system attachable to a structure, comprising:
    a C channel fixed to the structure in a generally vertical position, wherein the C channel includes a web and a first and second flange, the web of the C channel having at least one opening, and at least one of the flanges of the C channel including a longitudinal slot having at least two notches in the longitudinal slot a distance apart;
    a tie arm pivotally connected on a first end to the C channel and having at a second end a tether for receiving the lead of an animal, wherein the tie arm includes a first rigid section and a second rigid section, and a flexible section therebetween;
    a support arm having first and second ends, wherein the first end is pivotably connected to the tie arm and the second end has a transverse pin extending therethrough which travels in the longitudinal slot between the two notches when the adjustable animal tethering system is being adjusted, and the second end of the support arm rests in the opening of the C channel when the tie arm is in an elevated position.

11. The adjustable animal tethering system of claim 10, wherein the structure comprises a trailer and the C channel comprises a vertical frame member of the trailer.

12. The adjustable animal tethering system of claim 10, further comprising a second pin attached to the transverse pin by a cable and an opening in each flange of the fixed support for receiving the second pin, wherein the openings correspond to the notches in the flange of the fixed support.

13. A method of securing an animal to a structure using an adjustable animal tethering system which includes a tie arm adjustable between a first position and a second position higher than the first position, comprising the steps of;
    connecting the animal's lead to the tether of the tie arm while the tie arm is in the first position; and
    raising the tie arm to the second position following connection of the lead to the tether.

14. The method of claim 13, wherein the second position is approximately at least as high as the height of animal being secured.

15. The method of claim 13, wherein the second position is higher than the head of the animal being secured.

16. The method of claim 13, wherein the structure is a trailer.

17. An apparatus for restraining an object, comprising:

a tie arm attachment structure;

an elongated tie arm having a first end pivotally attached to the tie arm attachment structure and a second end having an attachment point to which a lead attached to the object is attachable;

a brace having a first end pivotally attached to the tie arm between the attachment point and the tie arm attachment structure;

a support structure, positioned below the tie arm attachment structure, providing a bearing surface for a second end of the brace such that the brace supports the tie arm in an elevated position; and wherein the tie arm attachment structure and the support structure comprise a single C channel.

18. The apparatus for restraining an object of claim 17, wherein the C channel is mountable on the side of a trailer and the tie arm pivots through a vertical plane extending substantially perpendicular from the side of the trailer.

19. The apparatus of claim 18, wherein the tie arm and the brace are nestingly received within the C channel when the apparatus is in a travel position.

20. An apparatus for restraining an object, comprising:

a tie arm attachment structure;

an elongated tie arm having a first end pivotally attached to the tie arm attachment structure and a second end having an attachment point to which a lead attached to the object is attachable;

a brace having a first end pivotally attached to the tie arm between the attachment point and the tie arm attachment structure;

a support structure, positioned below the tie arm attachment structure, providing a bearing surface for a second end of the brace such that the brace supports the tie arm in an elevated position; and wherein the support structure comprises a plurality of differently positioned bearing surfaces, wherein the second end of the brace is receivable on each of the plurality of bearing surfaces thereby allowing the height of the tie arm to be adjusted depending on the bearing surface selected.

* * * * *